United States Patent
Bell et al.

(10) Patent No.: US 7,255,187 B2
(45) Date of Patent: Aug. 14, 2007

(54) AXLE ASSEMBLY WITH PARALLEL DRIVE SYSTEM FOR ELECTRIC HYBRID VEHICLES

(75) Inventors: Dale K. Bell, Ortonville, MI (US); Dennis A. Kramer, Troy, MI (US); Dean M. House, Pataskala, OH (US); David K. Platner, Shelby, MI (US); Dale J. Eschenburg, Clinton Township, MI (US); Clive Harrup, Bromham Beds (GB); Mehmet S. Ciray, Greenwood, IN (US); Silvio M. Yamada, Gahanna, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 39 days.

(21) Appl. No.: 11/057,282

(22) Filed: Feb. 11, 2005

(65) Prior Publication Data

US 2005/0145424 A1     Jul. 7, 2005

Related U.S. Application Data

(63) Continuation of application No. 10/282,738, filed on Oct. 29, 2002, now Pat. No. 6,935,451.

(51) Int. Cl.
   *B60K 6/02* (2006.01)
(52) U.S. Cl. .................... 180/65.2; 180/65.6; 180/65.3
(58) Field of Classification Search ....... 180/65.2–65.6; 301/137; 477/2, 3, 8; 475/220, 331, 332
   See application file for complete search history.

(56) References Cited

U.S. PATENT DOCUMENTS

| | | | |
|---|---|---|---|
| 638,645 A | 12/1899 | Newman et al. | |
| 644,225 A | 2/1900 | Elsner | |
| 1,251,749 A | 1/1918 | Cilley | |
| 1,481,405 A | 1/1924 | Anglada | |
| 1,540,526 A | 6/1925 | Anglada | |
| 1,735,404 A | 11/1929 | Masury | |
| 1,906,930 A | 5/1933 | Ledwinka | |
| 3,186,506 A | 6/1965 | Leach et al. | |
| 3,799,284 A * | 3/1974 | Hender | 180/65.2 |
| 3,812,928 A | 5/1974 | Rockwell et al. | |
| 3,923,115 A * | 12/1975 | Helling | 180/65.2 |
| 4,146,104 A | 3/1979 | Leembruggen | |
| 4,330,045 A | 5/1982 | Myers | |

(Continued)

FOREIGN PATENT DOCUMENTS

CH     679 027 A5     12/1991

(Continued)

*Primary Examiner*—Christopher P. Ellis
*Assistant Examiner*—Vaughn T. Coolman
(74) *Attorney, Agent, or Firm*—Carlson, Gaskey & Olds

(57) ABSTRACT

The inventive parallel drive system is particularly well suited to be supported at the axle of the vehicle. A coupling arrangement includes a clutching mechanism and a gear reduction device that selectively couple an electric motor to the drive wheels for providing torque to the wheels alone or in combination with input from an internal combustion engine. The drive torque can also be provided exclusively from the internal combustion engine. The inventive arrangement also allows for the electric motor to be used as a generator during coasting or braking, for example.

18 Claims, 3 Drawing Sheets

U.S. PATENT DOCUMENTS

| | | | |
|---|---|---|---|
| 4,469,369 A | | 9/1984 | Belik et al. |
| 4,534,442 A | | 8/1985 | Botar |
| 4,930,590 A | | 6/1990 | Love et al. |
| 5,343,970 A | * | 9/1994 | Severinsky ................. 180/65.2 |
| 5,346,031 A | * | 9/1994 | Gardner ....................... 180/179 |
| 5,562,565 A | * | 10/1996 | Moroto et al. .................. 477/3 |
| 5,685,798 A | * | 11/1997 | Lutz et al. ................... 475/331 |
| 5,713,425 A | * | 2/1998 | Buschhaus et al. ........ 180/65.2 |
| 5,789,896 A | | 8/1998 | Fischer et al. |
| 5,823,280 A | * | 10/1998 | Lateur et al. ............... 180/65.2 |
| 5,947,855 A | * | 9/1999 | Weiss ............................. 475/5 |
| 6,044,922 A | * | 4/2000 | Field ........................ 180/65.2 |
| 6,081,042 A | | 6/2000 | Tabata et al. |
| 6,164,400 A | * | 12/2000 | Jankovic et al. ............ 180/65.2 |
| 6,205,379 B1 | | 3/2001 | Morisawa et al. |
| 6,288,508 B1 | | 9/2001 | Taketomi et al. |
| 6,387,007 B1 | * | 5/2002 | Fini, Jr. ....................... 475/268 |
| 6,411,879 B2 | * | 6/2002 | Kupper et al. ................. 701/51 |
| 6,416,437 B2 | * | 7/2002 | Jung ............................. 475/8 |
| 6,484,834 B2 | * | 11/2002 | Bowen et al. ............. 180/65.6 |
| 6,827,167 B2 | * | 12/2004 | Cikanek et al. ............ 180/65.6 |
| 2003/0181281 A1 | * | 9/2003 | Duggan et al. ............. 475/220 |
| 2003/0183431 A1 | | 10/2003 | Cikanek et al. |

FOREIGN PATENT DOCUMENTS

| | | |
|---|---|---|
| DE | 502313 | 3/1939 |
| DE | 41 12 624 C1 | 10/1992 |
| GB | 1 303 615 | 4/1971 |

\* cited by examiner

AXLE ASSEMBLY WITH PARALLEL DRIVE SYSTEM FOR ELECTRIC HYBRID VEHICLES

This application is a continuation of U.S. patent application Ser. No. 10/282,738 filed Oct. 29, 2002 now U.S. Pat. No. 6,935,451.

BACKGROUND OF THE INVENTION

This invention generally relates to drive systems for vehicles. More particularly, this invention relates to a parallel drive system having components mounted at the axle for selectively powering a drive axle of the vehicle.

Vehicles typically are powered by an internal combustion engine or one or more electric motors. Some so-called hybrid vehicles include a combination of an internal combustion engine and electric motor power. Such hybrid vehicles sometimes include parallel drive systems that provide propulsion modes from the electric motor, internal combustion engine or both.

Typically the mechanical coupling that allows selection between electrical or internal combustion power is mounted directly to the internal combustion engine, vehicle transmission or a so-called summation gearbox that combines the electric drive with the mechanical drive. Such arrangements allow for a controller or the vehicle operator to select between the electrical power and the internal combustion power for driving the vehicle.

A major drawback associated with such systems is that special modifications are required for the engine flywheel or the transmission to accommodate the additional coupling required. In embodiments including a summation gearbox, the vehicle chassis also typically must be modified to accommodate the additional components. The economical drawbacks of such arrangements renders them less than ideal. Further, such modifications typically are difficult to implement.

Those skilled in the art are constantly striving to make improvements and to render parallel drive system more economical and usable.

This invention provides a unique arrangement that allows a parallel drive system to be used without requiring modification of the engine flywheel, transmission or vehicle chassis.

SUMMARY OF THE INVENTION

In general terms, this invention is a parallel drive system arrangement suitable for mounting at the axle that selectively controls torque distribution from an internal combustion engine, an electric motor, or a combination of them to the drive wheels.

One example system designed according to this invention includes an axle housing. A coupling arrangement is supported at least in part by the axle housing. An electric motor selectively provides torque through the coupling arrangement to the wheels associated with the axle housing. An input from a vehicle internal combustion engine also selectively provides torque to the wheels, depending on the condition of the coupling arrangement.

An electronic controller operates the coupling arrangement so that torque is provided to the wheels selectively from a drive shaft input associated with the internal combustion engine or the electric motor. When the electric motor provides torque to the wheels, gear reduction assemblies preferably are engaged by the coupling arrangement to provide the desired amount of torque and gear reduction at the wheels. Such gear reduction accommodates for the typical differences between the speeds of electric motors and the desired torque and wheel speed.

In one example, the coupling arrangement selectively couples the electric motor in a generator mode to the wheels so that torque is transferred from the wheels to the motor during coasting or braking, for example. In such an arrangement, regenerative power is provided to charge a power source used to power the electric motor.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
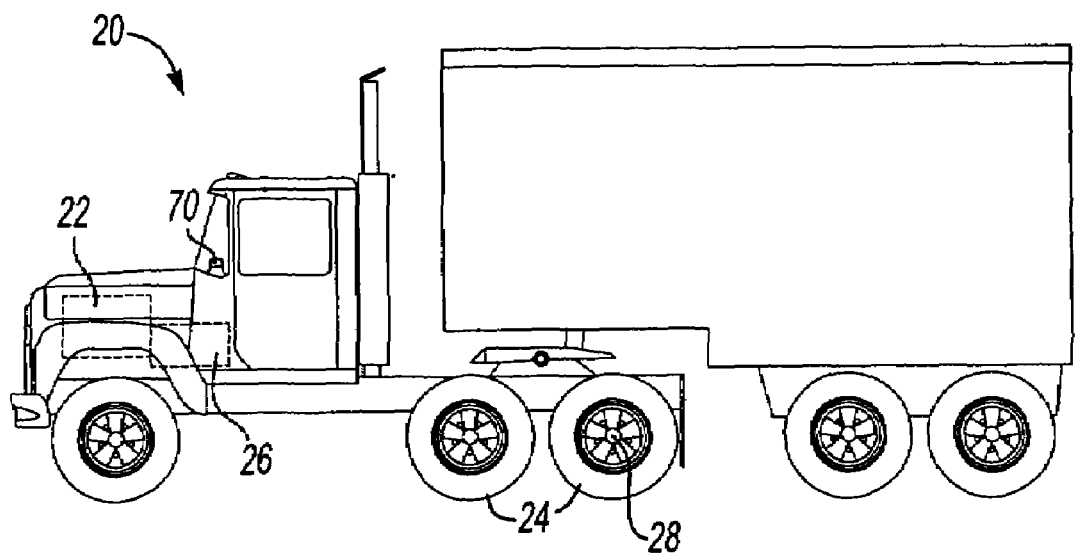
FIG. 1 schematically illustrates an example vehicle incorporating a drive system designed according to this invention.
Figure 2:
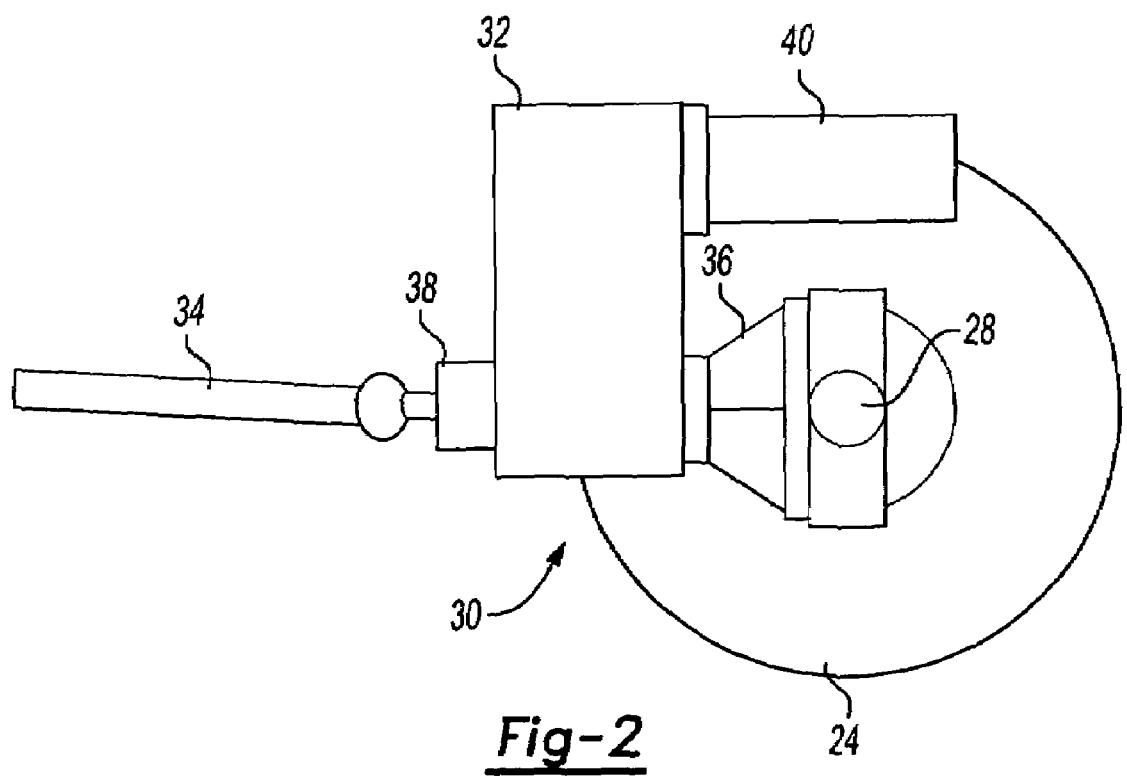
FIG. 2 schematically illustrates a drive system designed according to this invention.

FIG. 1 schematically illustrates a vehicle 20 that is one example type of vehicle with which the inventive drive system may be used. An internal combustion engine 22 provides a driving torque to wheels 24 through a conventional transmission arrangement 26. The wheels 24 are supported by axles 28 in a conventional manner.

Referring to FIGS. 2-5, the inventive drive arrangement includes an axle assembly 30 including a coupling arrangement or gear box 32 for selectively controlling torque distribution to or from the axles 28. When the internal combustion engine 22 provides the drive torque to the axles 28 (the wheels 24), a drive shaft 34 provides the necessary torque input to appropriate components within an axle housing 36 through a coupling 38. The axle housing 36 contains, for example, a conventional differential 39 for providing the desired torque distribution to the wheels 24. The drive shaft 34 provides driving torque to the wheels 24 depending on the operative condition of the coupling 38, which selectively couples the torque from the drive shaft 34 to the axle assembly as needed. In one example, the coupling 38 includes a clutch mechanism that selectively interrupts torque distribution from the drive shaft 34 to the components in the housing 36.

The axle assembly 30 also includes at least one electric motor 40 for providing drive torque to the wheels 24. An electronic controller 42 preferably controls operation of the electric motor 40. A variety of commercially available electric motors and microprocessors may be used within a system designed according to this invention. Those skilled in the art who have the benefit of this description will be able to select from among commercially available components and to develop the necessary software code to achieve the results provided by this invention.

One advantage of this invention is that all of the operative components for distributing torque and the electric motor can all be supported at the locations of the axle. By placing the coupling arrangement at the axle, modifications to the engine flywheel, transmission or vehicle chassis are rendered unnecessary making the inventive arrangement more readily incorporated into a variety of vehicles.

Figure 3:
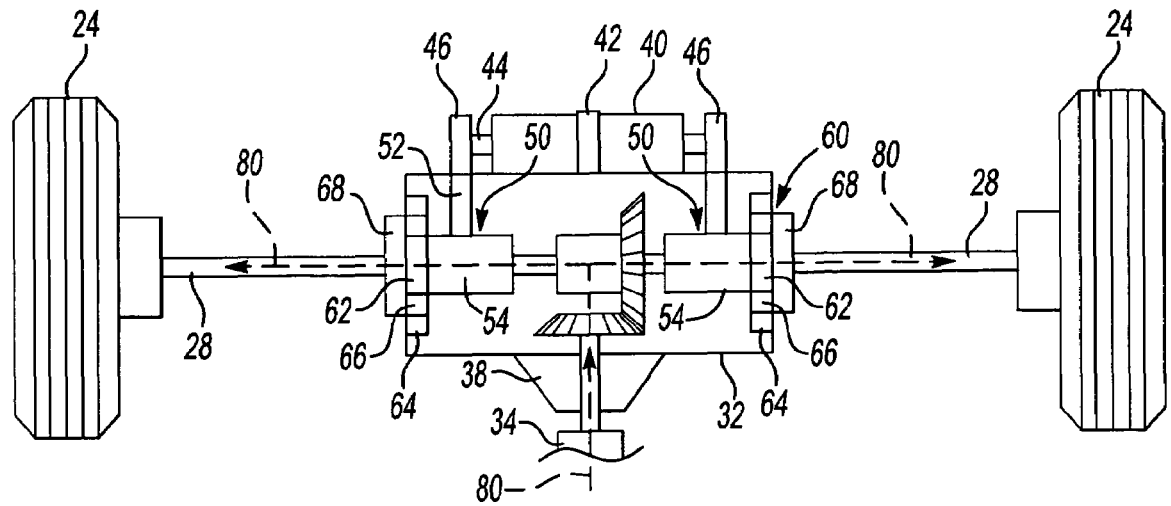
FIG. 3 schematically illustrates selected components of an example drive system designed according to this invention under a first set of operation conditions.

Referring to FIG. 3, the illustrated electric motor 40 includes output shafts 44 and associated output members 46. Rotation of the motor components provides rotation of the output members 46, which can provide torque to the wheels 24 as needed and will be described below.

A clutching mechanism 50 includes an input member 52 (i.e., an idler gear) and a clutch 54 for selectively coupling the output member 46 of the electric motor 40 with the axle 28. The clutch 54 may take a variety of forms, including hydraulic, electromagnetic or a combination of known technologies.

For providing the necessary gear reduction between the motor 40 and the axle 28, the inventive arrangement includes a gear reduction device 60 associated with the coupling arrangement or gear box 32. The example embodiment includes a planetary gear assembly having a sun input gear 62, a ring gear 64, which is fixed relative to the housing of the coupling arrangement or gear box 32 in the illustrated example. A plurality of pinion or planet gears 66 cooperate with the sun gear and ring gear 64 in a known manner such that an output member 68 provides the desired rotation and torque to the axle 28. The clutching mechanism 50 selectively couples the electric motor output to the axle and selectively controls the operation of the gear reduction device 60 so that the desired torque supply is achieved.

The electric motor 40, the coupling 38 and the clutching mechanism 50 all may be controlled by a single controller 42. In another example, individual controllers are dedicated to controlling the operation of each of these devices with the controllers communicating with each other to provide the desired system operation.

FIG. 3 illustrates a torque distribution from the internal combustion engine 22 through the drive shaft 34 to the axles 28. In this condition, the clutching mechanism 50 ensures that the motor 40 is not coupled to the axles 28 and the gear reduction devices 60 do not interfere with the torque delivered from the drive shaft 34 to the axle 28. This is a first mode of operation of the illustrated example arrangement. The torque distribution path is shown at 80 in FIG. 3.

Figure 4:
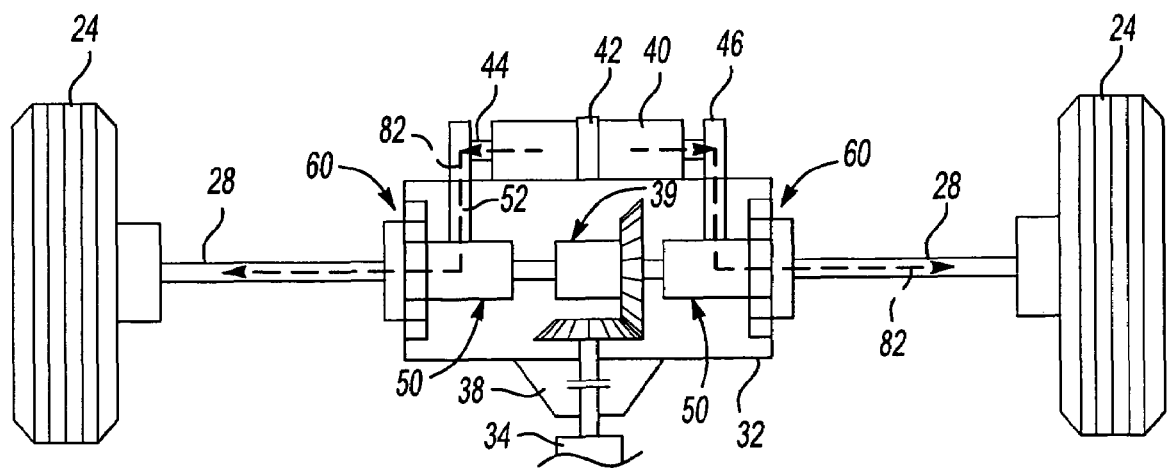
FIG. 4 illustrates the embodiment of FIG. 3 under a second set of operating conditions.

Under certain operating conditions, it may be desirable to provide torque to the axles 28 and wheels 24 exclusively from the electric motor 40. This operating condition is shown in FIG. 4 where the mechanical coupling 38 effectively isolates the drive shaft 34 from the differential 39 and the axle 28. Under these conditions, the clutching mechanism 50 selectively couples the output member 46 from the motor 40 to the input member 52 of the clutching mechanism and the clutches 54 cause appropriate engagement with the gear reduction devices 60 to deliver the desired amount of torque to the axles 28. The torque distribution path in this condition is shown at 82.

Figure 5:
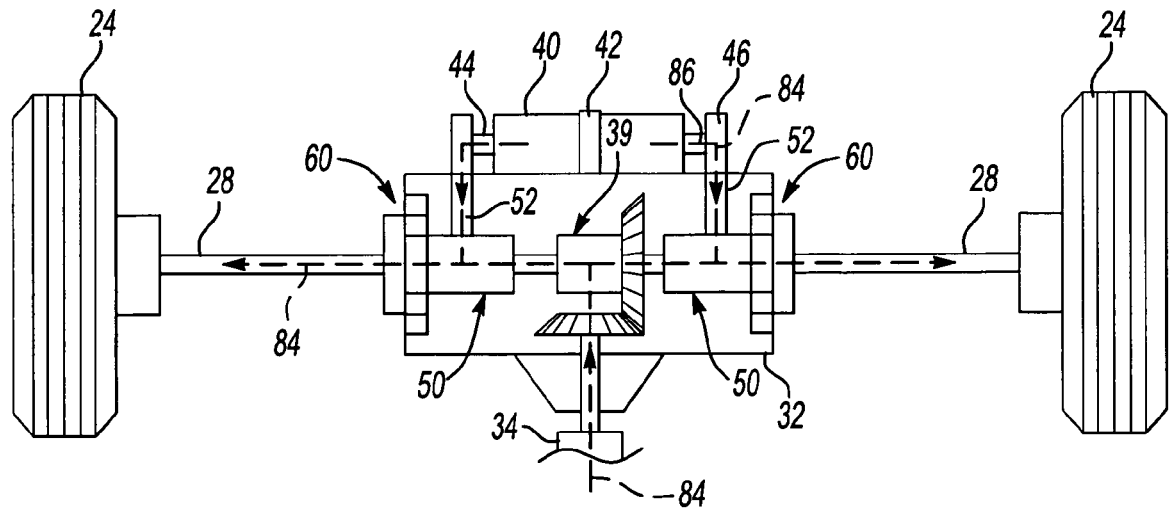
FIG. 5 illustrates the embodiment of FIG. 3 under a third set of operating conditions.

FIG. 5 schematically illustrates another operating condition where torque is supplied to the wheels 24 from a combination of the power from the internal combustion engine 22 and the electric motor 40. Such a torque distribution is schematically illustrated at 84.

Accordingly, the inventive arrangement calls for selectively providing driving torque to the wheels 24 from the internal combustion engine 22, the electric motor 40 or both. The controller 42 preferably is programmed to automatically distribute torque according to selected vehicle performance criteria. Such information may be obtained from a known engine controller already on the vehicle, for example. Those skilled in the art who have the benefit of this description will be able to suitably program a controller to meet the needs of their particular situation.

In another example, the vehicle operator is provided with an interface 70 such as control switches near the steering wheel in the driver compartment for selectively controlling the operation of the axle-mounted drive assembly and, therefore, the torque distribution.

Figure 6:
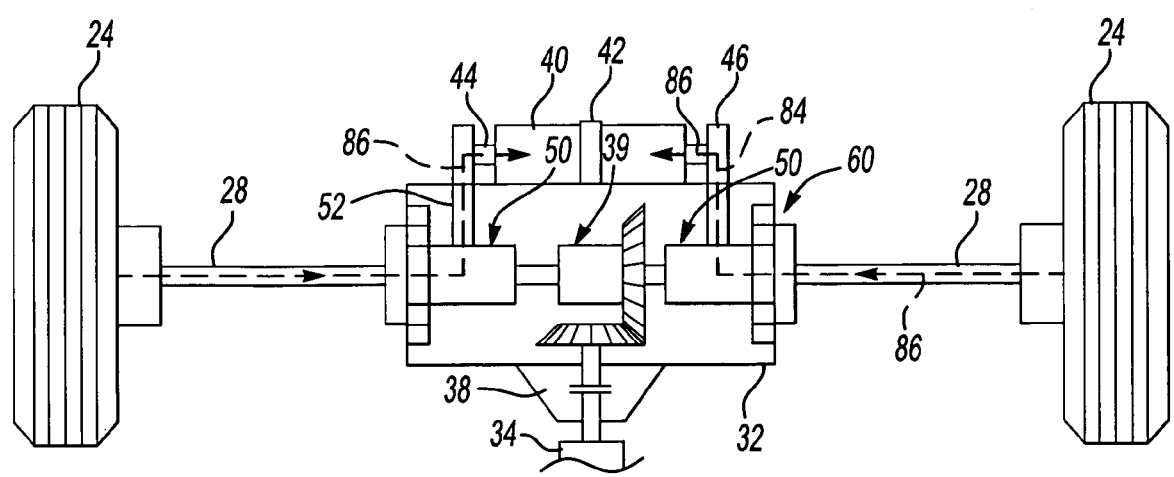
FIG. 6 illustrates the embodiment of FIG. 3 under a fourth set of operating conditions.

FIG. 6 illustrates another feature of the inventive arrangement. A torque distribution path schematically illustrated at 86 shows how torque from the wheels 24 may be transferred back to the motor 40 operating in a generator mode. During braking or coasting, for example, excess torque from the wheels 24 may be transmitted back through the clutching mechanisms 50 to provide rotation of the appropriate motor components to generate power for recharging a power supply (not illustrated) for the motor 40, for example. An additional advantage to such an arrangement is that such regenerative braking can provide additional braking force as may be needed or beneficial.

The drawings schematically illustrate one example assembly designed according to this invention. Other configurations are possible and within the scope of this invention. For example, the gear reduction devices 60 (i.e., planetary gear assemblies) may be mounted at the wheel hubs instead of near the center of the axle assembly. Depending on the particular vehicle and the manner in which the axle is supported relative to the vehicle chassis, the choice of where to mount the various components of the inventive arrangement can be varied to meet the needs of a particular situation. For example, to reduce the unsprung mass of the wheel end the gear reduction devices 60 and the electric motor 40 preferably would be supported near the center of the vehicle as schematically illustrated in FIGS. 3-6.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle axle assembly, comprising:
   an axle housing;
   at least one axle shaft supported for rotation relative to the axle housing;
   a first coupling device supported at least partially by the axle housing, the first coupling device selectively coupling a first input member to be driven by an internal combustion engine to the at least one axle shaft to provide torque to the at least one axle shaft wherein the first coupling device is adapted to directly couple a transmission output to the first input member;
   an electric motor supported at a location of the axle housing; and
   a second coupling device supported at least partially by the axle housing, the second coupling device selectively coupling a second input member associated with the electric motor to the at least one axle shaft to provide torque to the at least one axle shaft.

2. The assembly of claim 1, including a gear reduction device associated with the second coupling device to provide a desired amount of gear reduction between the second input member and the at least one axle shaft.

3. The assembly of claim 2, wherein the second coupling device selectively engages the gear reduction device.

4. The assembly of claim 2, wherein the gear reduction device comprises a planetary gear arrangement.

5. The assembly of claim 1, including a controller that controls operation of the first coupling device and the second coupling device to provide torque to the at least one axle shaft in at least a first mode where only the first input member provides torque to the at least one axle shaft and a second mode where only the second input member provides torque to the at least one axle shaft.

6. The assembly of claim 5, wherein the controller controls operation of the first coupling device and the second coupling device to provide torque to the at least one axle shaft in a third mode where the first and second input members provide torque to the at least one axle shaft.

7. The assembly of claim 1 including a gear box adapted to receive input from a transmission that is driven by the internal combustion engine, the gear box being supported by the axle housing and providing selective driving input from the transmission to the at least one axle shaft via the first coupling device, and wherein the electric motor is supported by the gear box.

8. The assembly of claim 7 wherein the at least one axle shaft comprises first and second axle shafts and wherein the gear box is connectable to drive the first and second axle shafts via a differential mounted within the axle housing when receiving input from the internal combustion engine, and wherein the gear box includes a first gear reduction device that drives the first axle shaft when receiving input from a first motor output of the electric motor and a second gear reduction device that drives the second axle shaft when receiving input from a second motor output from the electric motor, the second coupling device including a first clutch for selectively coupling the first motor output to the first gear reduction device and a second clutch for selectively coupling the second motor output to the second gear reduction device.

9. The assembly of claim 1, wherein the at least one axle shaft comprises two axle shafts, and including a differential supported within the axle housing and coupling the first input member to the two axle shafts, and including two of the second coupling devices, each of the second coupling devices associated with a respective one of the two axle shafts.

10. The assembly of claim 1, wherein the electric motor is at least partially supported on the axle housing.

11. The assembly of claim 1, wherein the electric motor is at least partially supported within the axle housing.

12. The assembly of claim 1, wherein the second coupling device is supported within a coupling arrangement housing that is supported by the axle housing.

13. The assembly of claim 1, wherein the second coupling device comprises at least one clutch.

14. The assembly of claim 1, wherein the first coupling device comprises a first clutch that selectively couples the transmission output to the first input member and the second coupling device comprises a clutch that selectively couples the at least one axle shaft to the second input member.

15. The assembly of claim 1 wherein the first coupling device is positionable between the transmission output and the axle housing.

16. A vehicle axle assembly, comprising:
an axle housing;
at least one axle shaft supported for rotation relative to the axle housing;
a first coupling device supported at least partially by the axle housing, the first coupling device selectively coupling a first input member to be driven by an internal combustion engine to the at least one axle shaft to provide torque to the at least one axle shaft, and the first coupling device coupling a transmission output to the first input member wherein the transmission output comprises a driveshaft;
an electric motor supported at a location of the axle housing; and
a second coupling device supported at least partially by the axle housing, the second coupling device selectively coupling a second input member associated with the electric motor to the at least one axle shaft to provide torque to the at least one axle shaft.

17. A vehicle axle assembly, comprising:
an axle housing;
at least one axle shaft supported for rotation relative to the axle housing;
a first coupling device supported at least partially by the axle housing, the first coupling device selectively coupling a first input member to be driven by an internal combustion engine to the at least one axle shaft to provide torque to the at least one axle shaft wherein the first coupling device is adapted to be positioned between a transmission and the first input member, and wherein the first input member comprises an input gear set that drives a differential enclosed within the axle housing;
an electric motor supported at a location of the axle housing; and
a second coupling device supported at least partially by the axle housing, the second coupling device selectively coupling a second input member associated with the electric motor to the at least one axle shaft to provide torque to the at least one axle shaft.

18. A vehicle axle assembly, comprising:
an axle housing;
at least one axle shaft supported for rotation relative to the axle housing;
a first coupling device supported at least partially by the axle housing, the first coupling device selectively coupling a first input member to be driven by an internal combustion engine to the at least one axle shaft to provide torque to the at least one axle shaft;
an electric motor supported at a location of the axle housing;
a second coupling device supported at least partially by the axle housing, the second coupling device selectively coupling a second input member associated with the electric motor to the at least one axle shaft to provide torque to the at least one axle shaft, wherein the second coupling device comprises at least one clutch and the at least one axle shaft comprises a first axle shaft and a second axle shaft, and wherein the at least one clutch comprises a first clutch that selectively couples an electric motor output to the first axle shaft and a second clutch that selectively couples an electric motor output to the second axle shaft.

* * * * *